United States Patent Office 3,471,534
Patented Oct. 7, 1969

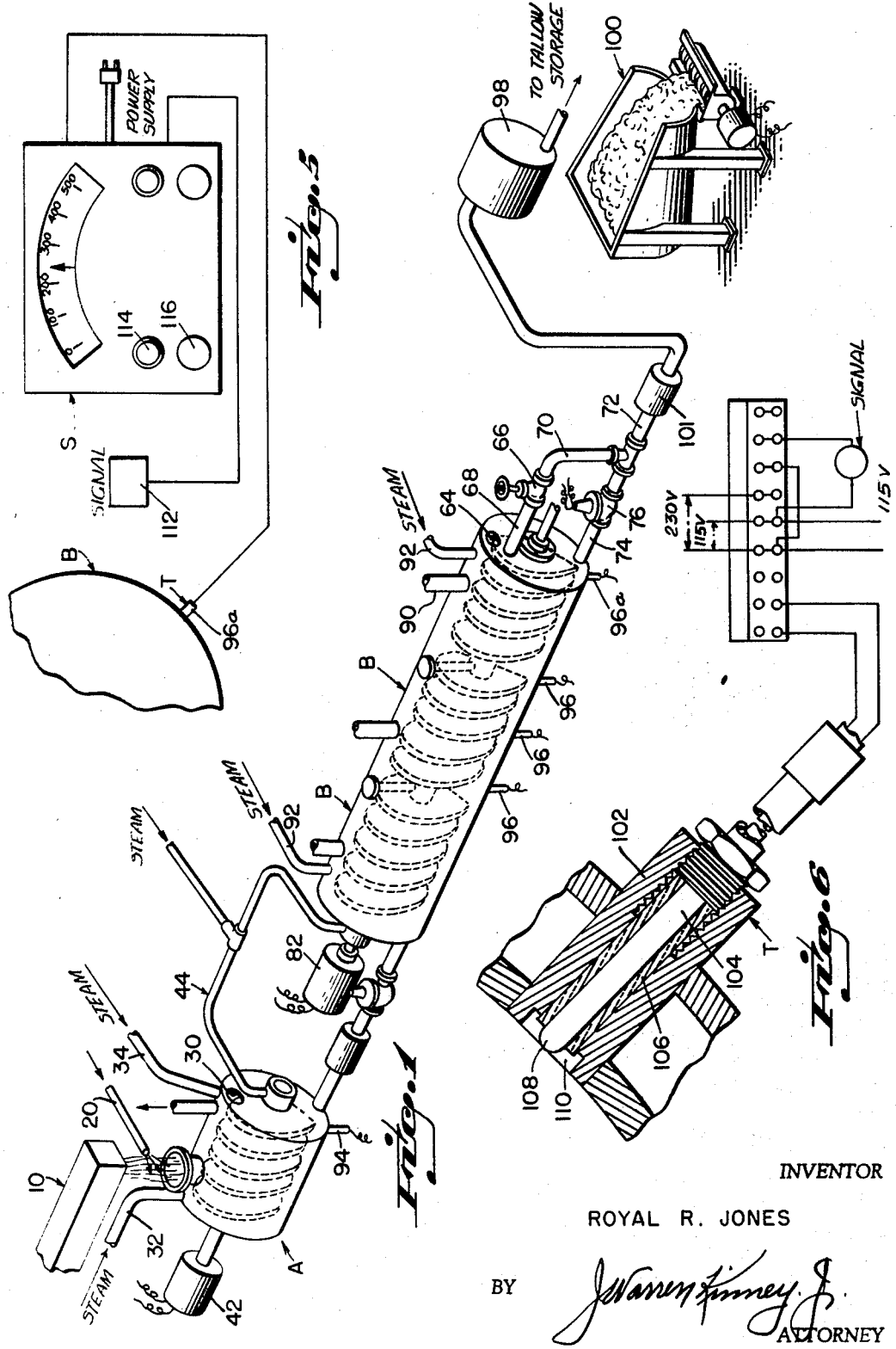

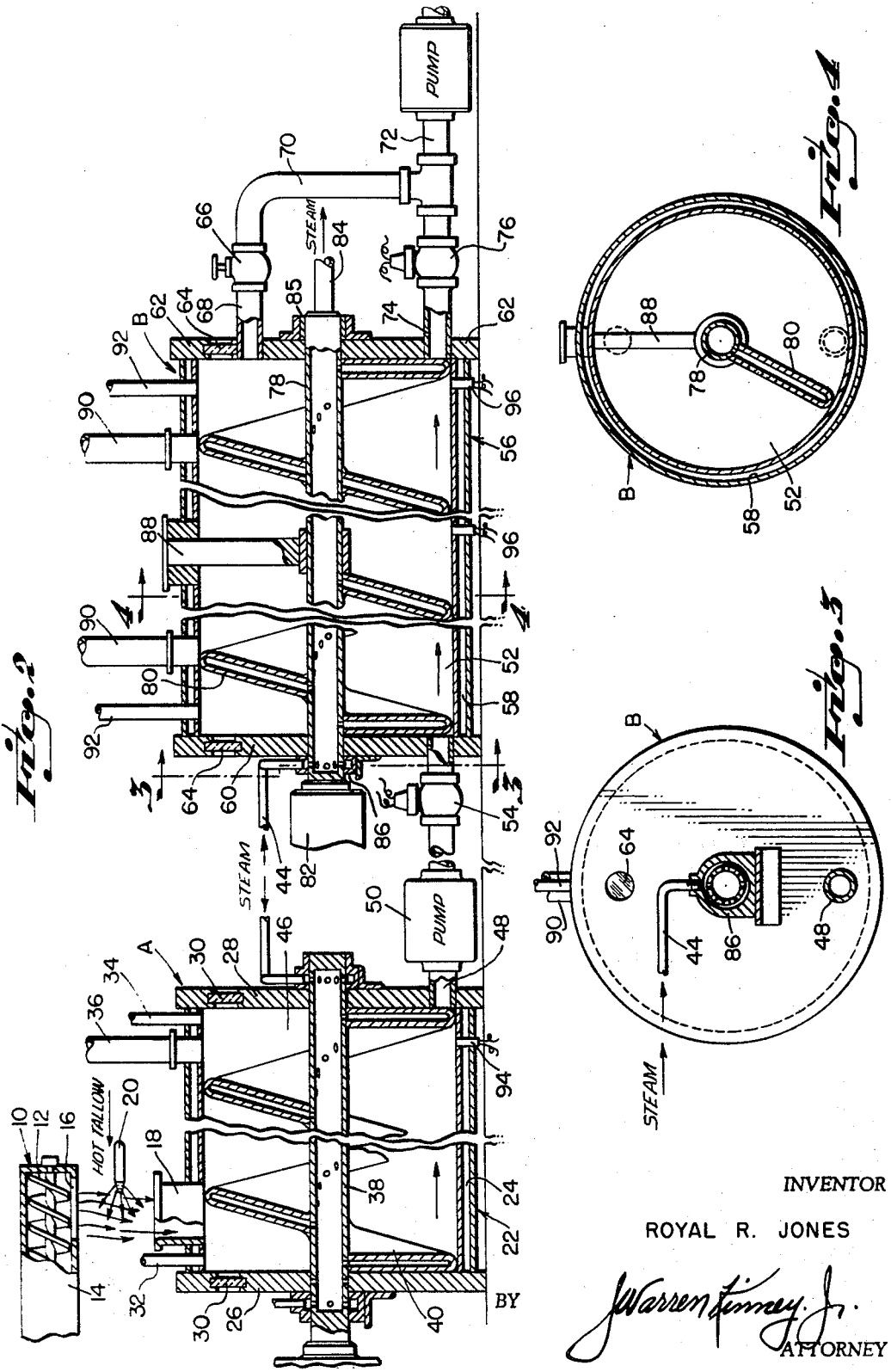

3,471,534
CONTINUOUS RENDERING SYSTEM
Royal R. Jones, Birmingham, Ala., assignor to The Cincinnati Butchers' Supply Company, Cincinnati, Ohio, a corporation of Ohio
Filed Feb. 3, 1966, Ser. No. 524,738
Int. Cl. C11b 1/12
U.S. Cl. 260—412.6        2 Claims

ABSTRACT OF THE DISCLOSURE

The method of continuous rendering of offal comprises conditioning the raw hashed offal by adding highly heated oil, and kneading the resultant mixture at high temperature to remove water; then transferring the dried product to a cooker wherein residual moisture and odor are removed under vacuum, and cooked to prepare the product for easy separation into crackling and a final pure oil ready for storage or immediate use.

---

This invention relates generally to an improved method or system of continuous rendering.

A principal object of the present invention is to provide a method of continuous rendering whereby the material under treatment is reduced at the termination of the treatment steps to a condition where the oils and cracklings may be readily completely separated and the oil is ready for use without further treatment.

Another object of the invention is to provide an improved method of rendering whereby the material under treatment has substantially all moisture removed therefrom in the one passage through the successive stages of treatment to which it is subjected whereby the ultimate product of the method of treatment consists of substantially completely moisture free oil and cracklings which are readily separable one from the other.

A further object of the invention is to provide an improved apparatus for continuous rendering whereby the various stages or steps of treatment of the starting raw material proceed continuously without interruption under automatic control to discharge the final pure oil extracted from the raw material, ready for storage or immediate use, with cracklings conditioned for centrifuging.

Another object of the invention is to provide apparatus for carrying out the present method wherein the raw material is moved through a steam heated or steam jacketed closed structure by means of a hollow screw connected with a hollow or tubular shaft through which steam is conducted to the hollow flights of the screw, whereby the material is thoroughly cooked for effecting complete extraction of the fats and oils therefrom.

The invention will be best understood from a consideration of the following detailed description taken in association with the accompanying drawings forming a part of the specification and illustrating a preferred form of apparatus suitable for carrying out the method and wherein:

FIG. 1 is a general or overall view in perspective of apparatus designed for carrying out the method of the present invention, in which various units of standard design or construction are merely diagrammatically illustrated.

FIG. 2 is a sectional view taken longitudinally of the apparatus illustrated in FIG. 1, in a vertical plane with parts shown in elevation, the middle portions of the steam jacketed conditioner and cooker being broken away and the structure being on an enlarged scale.

FIG. 3 is a transverse section taken substantially on the line 3—3 of FIG. 2.

FIG. 4 is a transverse section taken substantially on the line 4—4 of FIG. 2.

FIG. 5 diagrammatically illustrates a control unit for setting the temperature at which thermal couples operate to activate electrical units of the apparatus.

FIG. 6 illustrates in longitudinal section a standard type of thermal couple for activating electrical units of the apparatus at predetermined or preset temperatures.

The improved method of rendering in accordance with the present invention embodies the subjecting of the raw material to two stages of heat treatment.

The raw starting material may consist of any suitable type of animal matter including animal bones, cartilage and the like and all such matter generally referred to as offal. The starting material is first mashed, shredded or otherwise cut up or hashed to remove foreign material which will enhance pumping and cooking the material.

The prepared raw material is introduced into a suitable closed chamber for the first or conditioning operation. During introduction of the material into such chamber or prior to introducing the material into the conditioner chamber, the material has applied thereto, animal oil at a selected temperature and at a selected amount or percentage with respect to the quantity of raw material taken, the percentage of oil to raw material depending on the type of material. Preferably the preheated oil is sprayed on the raw material as it enters or passes into the conditioner chamber.

The preheated oil may be animal fat (grease or tallow or a combination of both) and the temperature of the oil as it is applied to or mixed with the raw material is preferably about 240° F. or it may be somewhat under this temperature, to keep discoloration to a minimum.

The addition of oil and fat to the hashed and shredded materials reduces the time required for carrying out the subsequent cooking operation. It also facilitates the transfer of the material from the conditioner chamber by pump means to a succeeding treatment chamber in which the materials are cooked.

Means is provided in the first or conditioner chamber for heating the materials therein and such means also functions to work or knead the materials as will be hereinafter made clear in the description of the mechanical mechanism employed.

The method of the present invention can be satisfactorily carried out with the percentage of preheated fat running as high as 20% maximum when running straight bone or as low as 2–3% when processing material with high fat content.

The material introduced into the conditioner chamber is subjected to a maximum temperature of from 190° to 200° F.

Whenever the contents of the conditioner reaches a temperature of 190° to 200° F., the material is transferred to the succeeding treatment chamber for cooking.

In the conditioner chamber the material is under atmospheric pressure.

Following the heating of the material in the conditioner chamber as stated, the material is transferred to a second or cooking chamber. Here in the cooker all of the water, which will run between 60 and 65% of the original material, is or must be cooked out. As long as more than 10% water is present in the material within the cooker, the temperature cannot exceed 212° F. However, after the water in excess of 10% has been boiled off from the charge of material in the cooker, the temperature in the cooker is raised or rises to about 220° F. The cooked material is then immediately removed from the cooker to prevent overheating.

Tte rate of operation of the conditioner and of the cooker is manually controlled for the particular material being processed. As will be hereinafter apparent, the material is moved by the mechanical means to be described, through the conditioner to a discharge end or discharge point and after the material is passed into the cooker, it is likewise moved therethrough by the mechanical means while the material is being subjected to the heating operation and the rate of operation of the mechanical means in both the conditioner and cooker is manually controlled as stated.

In subjecting the material to the conditioning and cooking phases of the method, raw material with a low water content will be moved at a faster rate than material having a higher water content.

The material in the cooker is cooked under a selected amount of vacuum. Preferably the cooking is carried out with the material being subjected to approximately 20 inches of vacuum.

The material in the cooker at the termination of the treatment therein, when the material is removed from the cooker, contains approximately 10% moisture.

In both the conditioner and in the cooker the chambers are provided with means for removing odors and vapor which are condensed by a suitable means.

The material at the completion of the cooking steps is centrifuged to separate the oils and cracklings.

The cracklings are transferred to an auto percolator for treatment in the same manner as in the present dry rendering system.

The drawings now about to be referred to illustrate apparatus suitable for carrying out the method of the present invention. While this illustrated apparatus would be a preferred form of construction, it is to be understood that the structure is not limited to all of the specific details shown as minor modifications may be made therein as will be obvious without departing from the spirit of the invention.

The apparatus illustrated by which the method of the invention may be carried out, embodies two material treatment units designated A and B. These units are steam jacketed treatment receptacles in the form of cylindrical drums or housings as shown.

While the apparatus will hereinafter be described in some detail, it is to be understood that the method is not limited to the use of the specific type of apparatus shown and claimed and accordingly the method as claimed is not a definition of the function of the apparatus as will be readily apparent.

In carrying out the method of the present invention by means of the particular apparatus herein illustrated the starting raw material in mashed, shredded or hashed form is conveyed to and discharged into the conditioner unit A by suitable means such as the screw conveyor structure illustrated and generally designated 10. This conveyor, while it may be of any suitable character, is here illustrated as embodying the screw 12 disposed in the suitable housing 14 and driven by suitable means, not illustrated, to carry the material to the housing discharge opening 16.

The conditioner A has a material receiving or inlet means generally designated 18 in which the raw material is discharged as illustrated.

As the raw material is discharged into the conditioner inlet 18 preheated oil in the form of tallow is sprayed from the discharge pipe 20 onto the raw material.

The percentage of the preheated oil or tallow sprayed on or mixed with the raw material is determined by the type of material to be treated.

The preheated oil may be animal fat of any type such as grease or tallow or a combination of both and the pre-selected temperature of the oil is approximately 240° F. or less, to keep discoloration to a minimum.

The addition of the preheated fat or oil to the hashed and shredded materials conveyed to the intake opening 18 of the conditioner considerably reduces the time required for cooking and also facilitates the transfer of the material by the pump means illustrated, to the cooker B.

The percentage of preheated fat or oil added to the raw material may run as high as 20% maximum when running straight bone or as low as 2–3% when processing or treating material of high fat content.

The conditioner A is a steam jacketed tank having therein a steam heated screw and shaft. This may be of the construction illustrated or of a conventional type of steam heated or steam jacketed tank in which the screw and shaft are also steam jacketed.

The conditioner structure embodies the double wall 22 of cylindrical cross section, thereby providing the encircling steam jacket 24, and the end walls 26 and 28 which may be of solid construction as shown.

The material inlet 18, is, of course, at the top of the tank and the end walls 26 and 28 have therein the sight windows 30 which are near the top of the tank for observing the height of material in the tank.

Suitable steam inlet and outlet pipes 32 and 34 are connected with the outer part of the hollow wall structure for introducing steam into the chamber 24 whereby the conditioner tank will be entirely jacketed except, of course, for the end walls which are of solid construction.

Suitable means is provided for removing from the chamber of the conditioner unit the vapors emitted by the material under treatment, such means here being designated as the pipe 36.

Extending axially through the conditioner chamber is the hollow shaft 38 carrying, or which may be formed integral with, the hollow flights of a feeding screw which is generally designated 40.

The material admission end of the shaft 38 is operatively connected with a vari-speed drive 42, in the form of an electric motor, while the opposite end of the tubular shaft 38 extends through the other or opposite end wall, designated 28, for connection with a steam supply pipe generally designated 44.

The chamber 46 of the conditioner unit and the material therein while it is under treatment, is under atmospheric pressure.

The screw 40 is driven or rotated in the direction to move the material toward the wall 28 and this wall is provided in the lower part of the unit with the outlet pipe 48 with which is connected one side of a suitable pump, generally designated 50 for taking the conditioned material from the chamber 46 and passing it on into the chamber 52 of the cooker unit, through the valve 54 when the latter is opened under the proper conditions of operation of the apparatus and when this occurs the valve which is of a conventional type and electrically operated, and the electrically operated pump 50 will function simultaneously.

The cooker unit generally designated B is of similar construction to the conditioner unit A but is of considerably greater length than the unit A as shown in FIG. 1.

As illustrated, the cooker comprises the hollow or steam jacket wall generally designated 56, the wall being in the usual two parts whereby is formed the steam jacket 58.

The end walls of the cooker, which are preferably of solid form or construction, are designated 60 and 62. Each of the end walls has fitted therein in the top portion of the cooker, the sight windows or glasses 64 whereby an attendant can observe the height of the contents of the chamber and take measures to remove a portion of the material if the chamber appears to be getting overfilled, by opening the manual valve 66 in the outlet pipe which has one end opening into the chamber 52 in the upper portion thereof as indicated at 68 while the opposite end of such pipe, designated 70 is connected with a carry off pipe 72 which receives material from the chamber 52, through the end of the pipe as indicated at 74, when the valve 76 is opened.

Extending axially through the cooker chamber is the hollow shaft 78 carrying the flights of the screw structure which is generally designated 80. The numeral 82 designates a vari-drive motor connected with the end of the screw shaft which extends through the wall 60 and the opposite end of the shaft is suitably rotatably supported as indicated at 84 in the opposite end wall 62 with means 84 for removing the steam after it has passed through the shaft, the supply of steam being by way of the previously referred to pipe 44 which has a connection with a suitable steam box or collar 86 whereby steam is introduced into the hollow shaft from which it passes into the hollow flights of the screw 80 as shown.

At intervals throughout the length of the cooker structure hanger bearing units 88 are provided for supporting the screw and shaft.

Means is provided for removing odors and vapors from the cooker chamber and also for maintaining the interior of the chamber and the material under a reduced pressure. Such means is here shown as comprising a suitable number of vapor extraction or withdrawal pipes 90. These pipes 90 are connected with a suitable vacuum condenser and the vapor line connected with the pipes is provided to dispose of vapors or odors developed while increasing the temperature of the raw material within the chamber.

Steam may be introduced into the jacket 58 in a suitable manner as by way of the steam pipe lines 92 whereby the contents of the chamber 52 can be raised in temperature and, as will be apparent, the heat of the steam will be applied to the interior of the mass of material through the walls of the hollow screw blades or flights and the screw shaft.

Thermometers in the form of thermo-couples are fitted into the walls of the conditioner and cooker units for sensing the temperature of the material therein as it passes through the units under the action of the feed screws.

The numeral 94 designates motor control thermo-couple or sensing device in the bottom of the wall of the conditioner unit while in the cooker a number of such temperature sensing devices are set in the bottom of the wall thereof, certain of which are designated 96, and are in a row longitudinally of the cooker, while the terminal one of the row, located adjacent to the receiving end of the carry-off pipe 72, is designated 96a. These thermometers or temperature sensing devices measure the temperature of the material as it moves in the chambers. As the material approaches the discharge end of the conditioner and the temperature reaches a pre-selected degree, the pump 50 will be operated to transfer the material from the conditioner into the cooker and the valve 54 will also be opened to permit this action to take place.

The temperature sensing thermometer also controls the supply of steam to the conditioner. In other words, if the material reaches a high degree or if it reaches too high a degree in the conditioner the controlling thermometer will cut off the steam supply until the material either cools or is transferred to the cooker. This control thermometer is of the form or construction illustrated particularly in FIG. 6 and it is in a suitably insulated jacket, container or receptacle to prevent the temperature in the steam jacket of the conditioner from affecting its functioning.

The material introduced into the conditioner is subjected to maximum temperature of from 190° to 200° F. Whenever the contents of the conditioner, adjacent to the discharge end thereof, that is, adjacent to the outlet pipe 48, reaches a temperature of 190° to 200° F. the valve 54 will be opened to permit the pump 50 to transfer the material into the cooker.

The rate of operation of the conveyor in the conditioner A and within the cooker B, may be manually controlled for the particular material being processed. Raw material with a low water content will be conveyed at a faster rate than material having a higher water content.

When the material has been transferred from the conditioner into the cooker substantially all of the water, which may run between 60% and 65% of the original material, must be cooked out of the material and as long as water in excess of 10% is present in the material within the cooker the temperature cannot exceed 212° F. However, after the water has been boiled off the temperature within the cooker rises to about 220° F., at which time the discharge valve 76 will be immediately and automatically opened for expelling the now fully treated contents of the cooker, and before the said contents is overcooked.

As stated, the screw in the cooker is rotated by a variable speed drive motor, conventionally illustrated and designated 82. Thus by varying the speed of rotation of the screw and by maintaining a vacuum in the cooker, which vacuum is preferably approximately 20 inches, the material being moved at a slow rate and under the vacuum, toward the outlet end of the cooker chamber, will have the desired amount of water removed at about the time it reaches the sensing device 96 at the outlet 74. Under these conditions of vacuum and rate of movement of the material, the material when ready for discharge from the cooker should not contain more than 10% of moisture.

The numeral 98 designates a centrifuge to which the material is pumped by means of the pump 101 in the pipeline 72 when conditions are right for opening the valve 76. Here, in the centrifuge, the oils and cracklings are separated and the oil is pumped to storage tanks while the cracklings may be transported to a percolator after which the cracklings are handled in the same manner as in the present day rendering system practice.

The centrifuge 98 may be of any standard type commercially available and capable of separating moisture, tallow and cracklings into three distinct and collecting devices. The centrifugal forces separate the three materials according to their respective specific gravities. The particular centrifuge utilized must have sufficient capacity to provide for a "continuous flow," such a centrifuge being of that type commercially available such, for example, as a "Titan" manufactured by Pfaudler-Permutit, Inc., of Rochester, N.Y.

The numeral 100 generally diagrammatically designates an auto percolator. This apparatus may be of any suitable character or construction and may be similar to that illustrated in U.S. Patent 2,845,180.

FIGS. 5 and 6 illustrate the temperature control switch device which is utilized to start the pump motors and FIG. 6 particularly illustrates a temperature sensing device or thermo-couple, such as those diagrammatically shown connected with the units A and B and designated by the reference characters 94 and 96.

The thermometer or thermo-couple is generally designated in FIG. 6 by the reference letter T and it is shown encased in the feeler housing 102 which is set in the double wall of the conditioner, or the cooker, as will be readily apparent, to span the space between the inner and outer parts of the double wall and which forms the steam jacket.

The tube 104 of the thermo-couple is enclosed in the heat resisting insulating sleeve 106, and, as shown, the heat sensitive tip 108 of the tube 104 of the thermo-couple is recessed as at 110 in the inner end of the housing 102 so as not to project into the cooker, in the wall of which it is mounted, but it is exposed in the cooker chamber in such manner as to be contacted on the tip 108 by the hot material being processed.

The temperature control switch device illustrated particularly in FIG. 5, is generally designated S.

This control device is of a standard well known make adapted for controlling electric circuits and is known commercially as "Alnor Pyrotroller."

In FIG. 5 the control switch device is shown connected with the terminal pyrometer or thermometer installed in the wall of the cooker and which is designated in FIG. 1 by the numeral 96a.

Conventional circuitry is employed for connecting the several thermometers and other electrical units with the control device whereby such electrical units will be set into operation as such operation is called for by the sensing devices or thermometers attached to the conditioner and cooker units.

Such circuitry may also include a signaling device, if desired, such as is designated 112, thus when the temperature increases beyond the point indicated on the dial of the control switch device, an electric circuit is closed which can operate an electric buzzer, bell, light or the like or actuate other elements as by starting or actuating solenoids or starting motors etc. or any combination of these items.

On the face of the control switch device as seen, in addition to the dial and pointer, adjusting and setting knobs, as for example, the knob 114 which designates the end point temperature adjusting knob while the numeral 116 designates the power on-off switch knob.

While a general disclosure is made of a standard automatic control means for a number of circuits in which the thermometers, valves, pump motors and other motors may be connected whereby the apparatus can be made to operate automatically, obviously the illustrated apparatus may be manually controlled, that is, the various electrical units thereof, by manually actuated switches when the temperature sensing devices by connection thereof with indicators or gauges indicate that such manual control of the different electrical units is called for.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:
1. The method of rendering which comprises the steps of mixing raw offal starting material with animal fat oil preheated to a temperature of approximately 240° F., the amount of preheated oil ranging between 2 and 20 percent of the amount of raw offal starting material, introducing the oil-material mixture into a closed conditioning chamber, progressively moving said mixture from one end of the chamber to the other end thereof, subjecting the mixture to heating in such chamber until the temperature of the mixture rises to about 200° F., subjecting the mixture to a stirring or kneading action during such heating, then transferring the mixture into a second closed chamber when said temperature of 200° F. is reached, progressively moving said mixture from one end of the second chamber to the other end thereof, subjecting the mixture in said second chamber to heating until the temperature of the mixture has reached 212° F., then continuing the cooking and permitting the temperature of the mixture to rise to about 220° F., then immediately removing the mixture from said second chamber and centrifuging the mixture to separate the oils and cracklings.

2. The method according to claim 1, with the step of subjecting the mixture while the said second chamber to approximately 20 inches of vacuum.

References Cited
UNITED STATES PATENTS

| | | | |
|---|---|---|---|
| 541,599 | 6/1895 | Dempsey | 260—412.6 |
| 732,151 | 6/1903 | Allbright | 260—412.6 |
| 1,966,181 | 7/1934 | Lowry | 260—412.6 |
| 2,199,670 | 5/1940 | Lowry | 260—412.6 XR |
| 2,875,222 | 2/1959 | Dormitzer | 260—412.6 |
| 3,046,286 | 7/1962 | Speer et al. | 260—412.6 |
| 3,158,634 | 11/1964 | Marsh | 260—412.6 |
| 3,171,847 | 3/1965 | Aikins | 260—412.6 |
| 3,295,929 | 1/1967 | Albright et al. | 260—412.6 XR |
| 3,345,353 | 10/1967 | Klubien | 260—412.6 XR |

LEON ZITVER, Primary Examiner.

H. T. MARS, Assistant Examiner.

U.S. Cl. X.R.

23—280